United States Patent
Smereski et al.

(10) Patent No.: US 7,787,058 B1
(45) Date of Patent: Aug. 31, 2010

(54) SYSTEM AND METHOD FOR PROVIDING INFORMATION SYNCHRONIZED TO A PLAYLIST

(75) Inventors: Michael W. Smereski, Kennesaw, GA (US); Donald Gary Ford, Kennesaw, GA (US)

(73) Assignee: The Weather Channel, Inc., Atlanta, GA (US)

( * ) Notice: Subject to any disclaimer, the term of this patent is extended or adjusted under 35 U.S.C. 154(b) by 1060 days.

(21) Appl. No.: 11/066,029

(22) Filed: Feb. 25, 2005

(51) Int. Cl.
*H04N 5/222* (2006.01)
*H04N 7/18* (2006.01)
*H04N 9/00* (2006.01)
*G06F 3/00* (2006.01)

(52) U.S. Cl. .......................... 348/722; 348/138; 725/9; 725/37; 715/716

(58) Field of Classification Search ............... 715/32, 715/704, 708, 716, 723; 725/17, 19, 20, 725/22, 32, 36, 37, 38, 50, 58, 115, 116, 725/117, 136, 144, 145, 146, 152, 9; 345/594, 345/601, 602; 348/138, 460, 722
See application file for complete search history.

(56) References Cited

U.S. PATENT DOCUMENTS

| | | | | |
|---|---|---|---|---|
| 5,695,401 A | * | 12/1997 | Lowe et al. | 463/4 |
| 6,134,379 A | * | 10/2000 | LaMacchia | 386/54 |
| 6,253,232 B1 | * | 6/2001 | Ito et al. | 709/208 |
| 6,393,198 B1 | * | 5/2002 | LaMacchia | 386/54 |
| 6,452,612 B1 | * | 9/2002 | Holtz et al. | 715/723 |
| 6,760,916 B2 | * | 7/2004 | Holtz et al. | 725/34 |
| 6,952,221 B1 | * | 10/2005 | Holtz et al. | 715/723 |
| 6,965,863 B1 | * | 11/2005 | Zuberec et al. | 704/270 |
| 2002/0053078 A1 | * | 5/2002 | Holtz et al. | 725/14 |
| 2002/0109710 A1 | * | 8/2002 | Holtz et al. | 345/723 |
| 2002/0175931 A1 | * | 11/2002 | Holtz et al. | 345/716 |
| 2002/0186233 A1 | * | 12/2002 | Holtz et al. | 345/716 |
| 2003/0145338 A1 | * | 7/2003 | Harrington | 725/136 |
| 2004/0210945 A1 | * | 10/2004 | Snyder et al. | 725/135 |
| 2005/0042591 A1 | * | 2/2005 | Bloom et al. | 434/307 A |

* cited by examiner

*Primary Examiner*—Hoang-Vu A Nguyen-Ba
(74) *Attorney, Agent, or Firm*—Lawrence A. Aaronson, P.C.

(57) ABSTRACT

Information is provided to on-air personnel that is synchronized to a playlist executed by a broadcast automation system. A type is defined within a broadcast automation system and is associated with studio segments and non-studio segments that follow studio segments in a playlist. As the playlist is executed, the broadcast automation system provides a count until the next segment with the specified type. The count is monitored and if the count matches a predetermined value, then a trigger is generated based on the predetermined value and the playlist. Each trigger is associated with a particular action, such as the display of a message on certain display units. Once the trigger is generated, the action is performed. The invention can be used to automatically provide countdown information to on-camera personnel based on the playlist.

18 Claims, 4 Drawing Sheets

10 sec 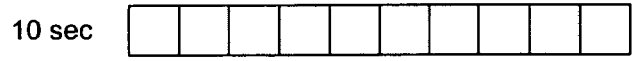
Figure 4A
5 sec 
Figure 4B
4 sec 
Figure 4C
3 sec 
Figure 4D
2 sec 
Figure 4E
1 sec 
Figure 4F
Attention  A T T E N T I O N
Figure 4G

SYSTEM AND METHOD FOR PROVIDING INFORMATION SYNCHRONIZED TO A PLAYLIST

TECHNICAL FIELD

The present invention is directed in general to providing cueing information for use in producing a broadcast, and in particular to providing automated cueing information based on a playlist.

BACKGROUND

To ensure that the various segments of a live broadcast, such as a news, weather, sports or financial broadcast are synchronized, broadcast facilities and news organizations have traditionally used manual cueing methods. For example, a master control operator monitors a show schedule log, as well as time clocks, to determine when time cues should be given to the on-air personnel. The master control operator provides time cues to the producer, typically by providing verbal cues via the station's intercom system. The producer in turn provides the cues to the stage manager, who is in the studio with the on-air personnel. The stage manager provides the cues to the on-air personnel, typically by using simple hand gestures. Although this process may differ slightly from studio to studio, it is the inventors' understanding that all current processes use a combination of verbal and visual cueing.

One disadvantage of the current methods is that they require a number of people to provide cueing information, which is expensive. This is especially true for those broadcasters and news organizations that provide live programming throughout most of the day. Another disadvantage is that errors can occur due to breakdowns in communication or other human errors.

Thus, there is a need for a system and method for cueing on-air personnel that requires fewer personnel and provides greater accuracy than current methods.

SUMMARY OF THE INVENTION

The present invention meets the needs described above by providing automatic cueing information to on-air personnel. In one aspect of the invention, existing components, such as a broadcast automation system and a display controller, are used. A new type is defined within the broadcast automation system. The type is associated with studio segments and non-studio segments that follow studio segments in the playlist maintained by the broadcast automation system. As the playlist is executed, the broadcast automation system provides a count until the next segment with the specified type. The count is monitored and if the count matches a predetermined value, then a trigger is generated based on the predetermined value and the playlist. Each trigger is associated with a particular action, such as the display of a message on certain display units. The display controller receives the trigger, determines the information and the display units associated with the trigger, and generates a message to the appropriate display units that includes the information. As an example, the present invention can provide a series of countdown displays to on-camera personnel to indicate the time remaining until the start or end of a studio segment.

In another aspect of the invention, a manual interface is provided that supports additional, actions. For example, the manual interface allows a user to generate one or more triggers and can be used to generate messages to inform the on-air personnel of changes to the scheduled program segments.

These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

FIGS. 4A, 4B, 4C, 4D, 4E, 4F and 4G are exemplary displays in accordance with an embodiment of the invention.

DETAILED DESCRIPTION

The present invention is directed to automatically providing cueing information to on-air personnel in a live, automation controlled broadcasting environment. In one embodiment, the present invention provides a series of countdown displays to on-camera personnel to indicate the time remaining until either the start or end of a studio segment. The accuracy and reliability of the countdown is increased over a manual countdown because the countdown is synchronized to the playlist provided by the broadcast automation system. A new type is defined and is used to indicate a countdown point. The type is associated with studio segments and non-studio segments that follow a studio segment in the playlist. As the playlist is executed, the broadcast automation system generates a count until the next segment having the specified type. The count is monitored and when the count equals a predetermined value, a message is generated to the on-camera personnel.

Exemplary System

Figure 1:
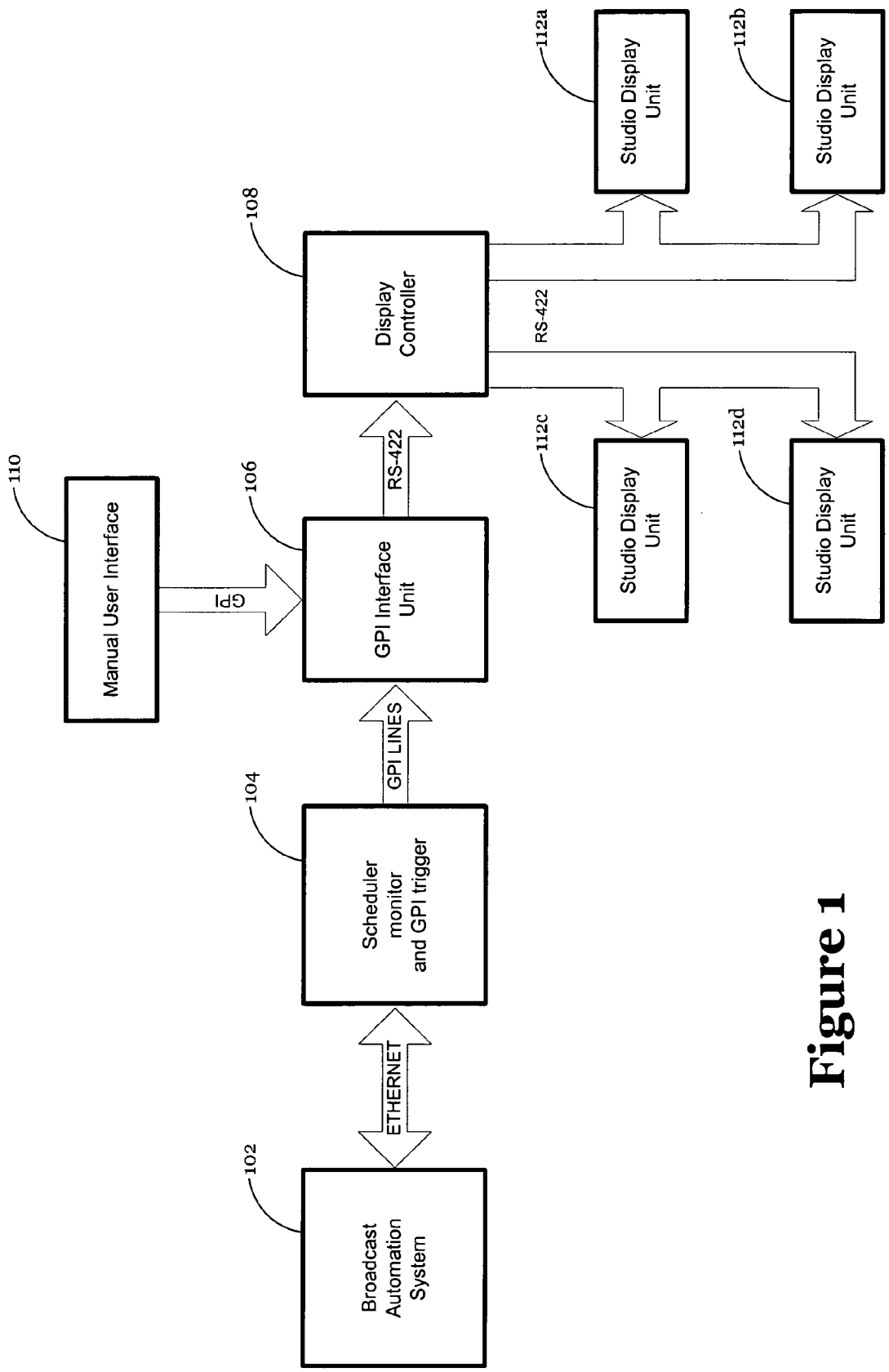
FIG. 1 is a block diagram of an exemplary operating environment for the invention.

FIG. 1 illustrates an exemplary operating embodiment for the present invention.

The broadcast automation system 102 is a conventional system used in television or radio broadcasting, such as those available from Harris and Sundance. The broadcast automation system supports the creation, editing and execution of a playlist. The system also controls external devices, such as data servers, video servers, and media servers, to provide the content used in the various program segments in accordance with the execution of the playlist.

The scheduler monitor and GPI trigger 104 monitors the broadcast automation system via an interface, such as an Ethernet interface. In one embodiment, the scheduler monitors a count that is generated by the broadcast automation system. The count represents the time until a segment with a particular type is active. When the count reaches a predetermined value, the scheduler generates a trigger that is based upon the playlist and the predetermined value. In the embodiment illustrated by FIG. 1 a General Purpose Interface (GPI) trigger is generated.

The GPI interface unit 106 receives GPI triggers from the scheduler 104 and the manual user interface 110. The GPI interface unit converts the GPI triggers into serial information and provides the information to the display controller 108. The number and type of triggers that can be supported by the GPI interface unit is implementation dependent. In one embodiment there are 40 GPI interfaces in the system.

The display controller receives the trigger information from the GPI interface unit and determines the content of the information, as well as the display units to which the information is directed. The information content and display units associated with each trigger are predetermined. In the embodiment illustrated by FIG. 1, the association is maintained by the display controller. Different triggers can be used to provide different content and/or to identify different display units.

The display controller communicates with one, some or all of the studio display units 112a, 112b, 112c, and 112d, so that the appropriate information is displayed on the appropriate units. In one embodiment the display controller is a dot matrix display controller, such as those provided by Image and Tally. Each of the studio display units is independently addressable. Typically, each has a serial number that is used as an address. The serial numbers can be assigned to groups so that the same message can be sent to multiple display units using a single trigger.

The manual user interface 110 allows the system to accept manual triggers, i.e. triggers that are not based on the playlist. In one embodiment, the manual user interface 110 is a simple button panel with different messages associated with different buttons. The activation of a button generates a trigger to the GPI interface unit. For example, if the message, "ATTENTION" is associated with a button, then the button can be activated when it is necessary to get the attention of the on-camera personnel.

The embodiment illustrated in FIG. 1 is designed to maximize the use of existing components, while minimizing changes to the broadcast automation system. The broadcast automation system is a critical component. If it fails, then the broadcast will likely be interrupted. The particular components and communication protocols described in connection with FIG. 1 are exemplary. Additional and alternative configurations that use fewer, more and/or different components will be apparent to those skilled in the art.

Exemplary Playlist

Figure 2:
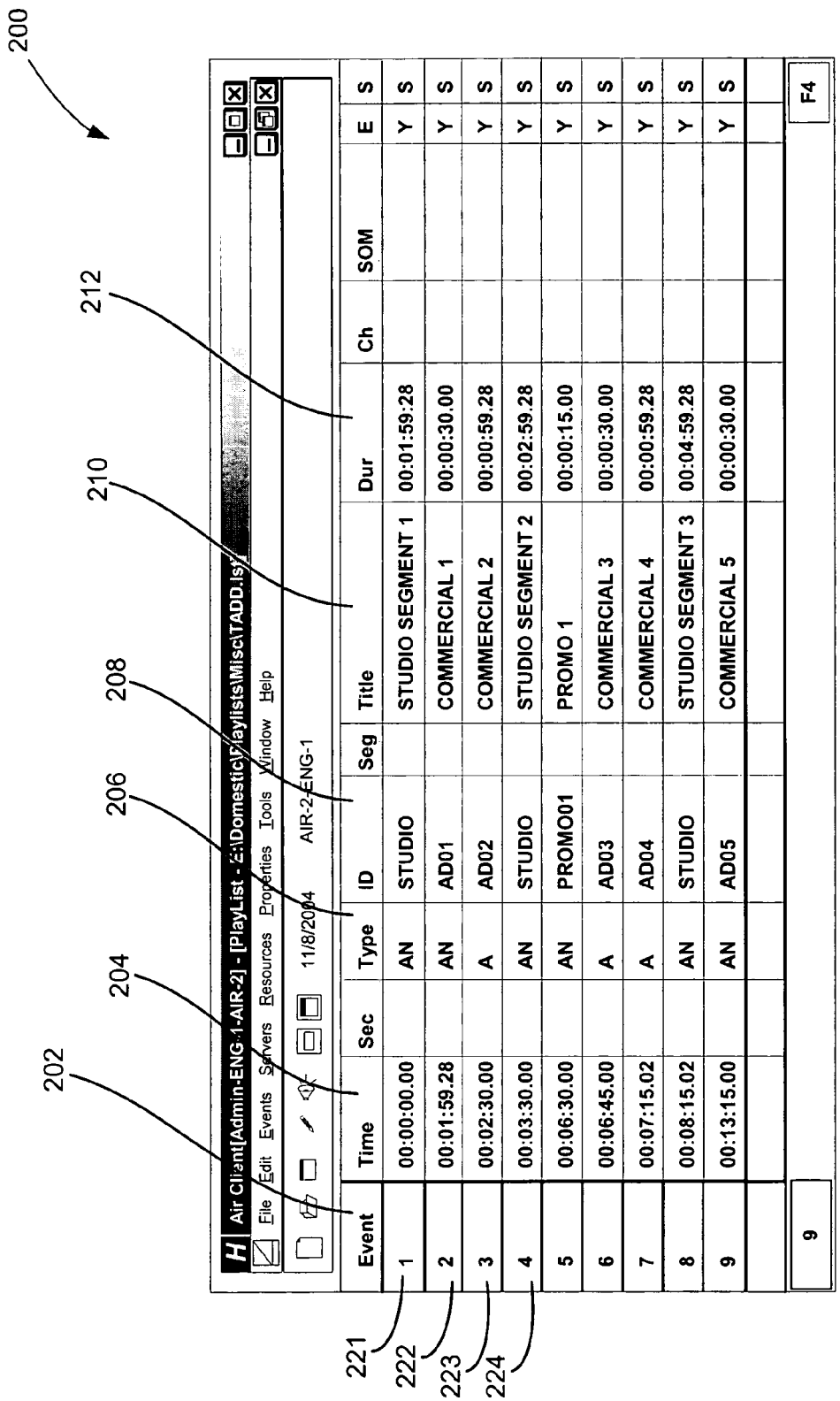
FIG. 2 is a block diagram illustrating a playlist in accordance with an embodiment of the invention.

FIG. 2 illustrates an exemplary playlist. The playlist lists the events or segments that comprise a broadcast program. The different segments are shown as separate events on the playlist. For example, event 1 (221) is a studio segment, event 2 (222) is a commercial segment, event 3 (223) is another commercial segment and event 4 (224) is another studio segment. The playlist defines a number of fields for each segment, including an event field 202, a time field 204, a type field 206, an ID field 208, a title field 210, and a duration field 212.

The present invention defines a new type, shown as type "N" in FIG. 2. The type "N" is used as a marker that identifies a countdown point. The broadcast automation system is programmed so that it generates a count until the next marker. For example, while the playlist is executing, the broadcast automation system generates a count until the next segment associated with type "N". All studio segments are marked as type "N", as well as all segments that follow studio segments. In this manner, the marker can be used as a countdown to cue the on-camera personnel that a studio segment is either beginning or ending.

The playlist supports multiple types per segment. Thus, a segment can be associated with type "N" without affecting any other type associations. For example, FIG. 2 illustrates that all segments are associated with type "A", while selected segments are associated with type "N". Although FIG. 2 illustrates that a single type is used to generate all messages, multiple types could be defined and used to generate different message content and/or identify different display units.

One of the advantages of using a count associated with the playlist is that the playlist automatically adjusts to reflect the actual duration of a segment. For example, if a segment was scheduled for thirty seconds but was actually only twenty-eight seconds, then the playlist adjusts to reflect the actual value of the segment and in turn the count until the next marker is also automatically adjusted.

Exemplary Method for Providing Information

Figure 3:
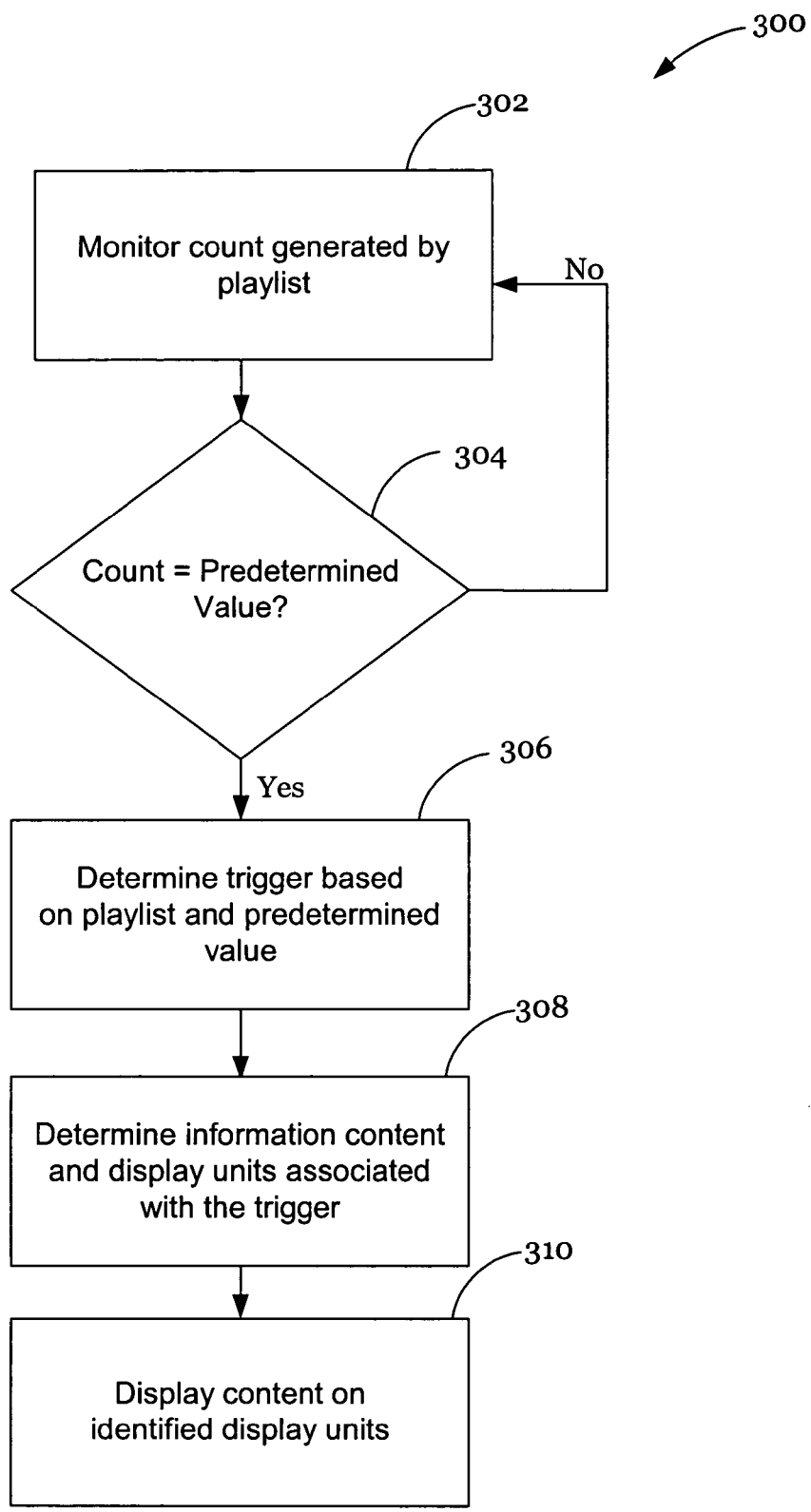
FIG. 3 is a flow diagram illustrating a method for providing information based on the playlist in accordance with an embodiment of the invention.

FIG. 3 illustrates an exemplary method 300 for providing information synchronized to a playlist. The method is repeated throughout the broadcast. If multiple playlists are used, then the method is performed for each playlist. In step 302, the scheduler monitors the count until the next segment associated with a marker that is generated by the broadcast automation system. In step 304, the scheduler compares the count to a set of predetermined values. If the count equals one of the predetermined values, then the Yes branch is followed to step 306. In step 306, the scheduler determines the appropriate trigger based upon the predetermined value and the playlist. The display system determines the information content and the identity of the display units based on the trigger in step 308. In step 310, the content is provided on the appropriate display units.

If the determination in step 304 is that the count does not equal the predetermined value, then the No branch is followed back to step 302 and the scheduler continues to monitor the count generated by the broadcast automation system. In one embodiment, the scheduler monitors the count once a frame, i.e. 30 times a second.

As an example, if the count corresponds to a predetermined value that indicates that there are ten seconds until a studio segment begins, then the scheduler issues a trigger associated with a ten-second count and the display units that correspond to the studio(s) associated with the playlist. When the display controller receives the trigger, the display controller determines the content of the ten-second message and provides the content to the appropriate display units. When the count corresponds to a different predetermined value that indicates that there are five seconds until the studio segment begins, then the scheduler issues a trigger that is associated with a five second count and the appropriate display units. When the display controller receives the trigger, the display controller determines the content of the five-second message and provides the content to the display units. In this manner, different predetermined values can correspond to different messages Exemplary Displays FIGS. 4A through 4G illustrate exemplary messages that are provided to the on-camera personnel via the display units. In one embodiment, the display units include tri-color LED grid segments. Each segment can be separately addressed and can be illuminated using any one of three colors, such as green, amber, or red. The segment and color information for an exemplary countdown sequence is described in connection with FIGS. 4A through 4F. FIG. 4A illustrates a ten-second message. The message is a red bar that spans the entire width of the display. FIG. 4B illustrates a five-second message. The message includes two small green bars, one at either end of the display, displayed on a black background. FIG. 4C illustrates a four-second message. The four-second message includes the two small green bars, but the bars are closer together than the bars in the five-second message. FIG. 4D illustrates a three-second message. The three-second message includes two small amber bars that are the same size as the green bars in FIGS. 4B and 4C, but are closer together than the bars in the four-second message. FIG. 4E illustrates a two-second message. The two-second message includes the two small amber bars, but the bars are closer together than the bars in the three-second message. FIG. 4F illustrates a one-second message. The one-second message includes two small red bars that are adjacent to one another. At zero seconds the display is turned off. The sequence illustrated by FIGS. 4A through 4F provide both placement and color information that correspond to the countdown.

In one embodiment, the messages are shown on the displays until they are turned off. Thus, the ten second message can be flashed by creating a nine second message that turns the display off.

Other types of messages are possible, such as the "ATTENTION" message illustrated by FIG. 4G. In one embodiment, the "ATTENTION" message is sent to the on-camera personnel via the manual interface. Other messages could include "MICROPHONE OFF", "SKIP STORY", or any other message that can be displayed on the display unit. The content of the message can be conveyed by both text or graphics and color.

Additional alternative embodiments will be apparent to those skilled in the art to which the present invention pertains without departing from its spirit and scope. For example, the invention is not limited to countdown information, but can be used to provide any type information. In addition, the invention is not limited to providing information, but can be used to synchronize controls or actions other than those managed by the broadcast automation system. Moreover, the invention is not limited to the use of a single trigger. Additional trigger types can be defined. The additional trigger types can be associated with particular types of messages or other actions. Accordingly, the scope of the present invention is described by the appended claims and is supported by the foregoing description.

What is claimed is:

1. A method for providing information during a live broadcast, comprising:
    as a playlist is executing on a live, broadcast automation system, monitoring a count associated with the playlist using a scheduling system external to the broadcast automation system,
    wherein the playlist includes a plurality of segments that comprise the live broadcast and a first marker is associated with a first segment and wherein the count represents a time until the start of the first segment;
    determining by the live, broadcast automation system whether the count matches a predetermined value during the live broadcast and generating a trigger to a General Purpose Interface (GPI);
    if the count matches the predetermined value, then based on the playlist and the predetermined value,
        determining, at a display controller, content of the information received from the GPI, and identifying at least one display unit from a plurality of display units,
        wherein, during a segment that precedes the first segment, the content graphically conveys a number of seconds until the first segment based on the count; and
        providing the content to the at least one display unit for display to a person on-camera during the live broadcast.

2. The method of claim 1, wherein monitoring a count is performed every frame, further comprising changing the content as the count changes.

3. The method of claim 1, wherein the content indicates the number of seconds until a start of a studio segment.

4. The method of claim 1, wherein the content indicates the number of seconds until a start of a non-studio segment.

5. The method of claim 1, wherein determining content of the information and identifying at least one display unit comprises:
    activating a trigger;
    transmitting the trigger as serial information;
    receiving the trigger and using the trigger to determine the number of seconds to the first segment and the at least one display unit from the plurality of display units.

6. A system for providing information, comprising:
    a live broadcast automation system for executing a playlist of segments the comprise a live broadcast, the playlist including a first marker associated with a first segment, and for providing a count in a preceding segment during the live broadcast until the first segment while the playlist is executing, wherein the first marker corresponds to a transition between the preceding segment and the first segment wherein one segment is a non-studio segment and one segment is a studio segment;
    an external monitoring system interfacing with the live broadcast automation system; for monitoring the count produced by the live broadcast automation system during the live broadcast until a start of the first segment, for determining when the count until the first segment equals a predetermined value, for generating a first GPI (general purpose interface) trigger when the count until the first segment equals the predetermined value, and for transmitting the first GPI trigger to a display system as serial information, wherein the first GPI trigger is selected based on the playlist and the predetermined value; and
    the display system interfacing with the external monitoring system for receiving the first GPI trigger during the live broadcast, for determining information content and display devices associated with the first GPI trigger, and for providing the information content to the display devices, wherein the information content graphically conveys a number of seconds until a start of the first segment, to a person on-camera.

7. The system of claim 6, wherein the information content indicates the number of seconds until a studio segment begins.

8. The system of claim 6, wherein the information content indicates the number of seconds until a non-studio segment begins.

9. The system of claim 6, further comprising:
    a manual user interface interfacing with the external monitoring system for generating a second GPI trigger, wherein the display system is further operable for receiving the second GPI trigger, determining information content and display devices associated with the second GPI trigger and providing the information content associated with the second GPI trigger to the display devices associated with the second GPI trigger.

10. The system of claim 6, wherein the external monitoring system is further operable for monitoring a count until a second segment in a second playlist, wherein the second segment is associated with a second marker, for determining when the count until the second segment equals the predetermined value, and for generating a second GPI trigger when the count until the second segment equals the predetermined value.

11. The system of claim 10, wherein the display system is further operable for receiving the second GPI trigger, for determining second information content and at least a one display device associated with the second GPI trigger, and for providing the second information content to the display devices associated with the second GPI trigger, wherein the second information content conveys a text message to the person on-camera.

12. The system of claim 11, wherein the display devices associated with the second GPI trigger are distinct from the display devices associated with the first GPI trigger.

13. The system of claim 6, wherein the external monitoring system is further operable for monitoring a count until a second segment in the playlist, wherein the second segment is associated with a second marker, for determining when the count until the second segment equals the predetermined value, and for generating a second GPI trigger when the count until the second segment equals the predetermined value.

14. The system of claim 13, wherein the display system is further operable for receiving the second GPI trigger, for determining second information content and display devices associated with the second GPI trigger, and for providing the second information content associated with the second GPI trigger to the display devices associated with the second GPI trigger.

15. A method for generating a time-based trigger, comprising:
monitoring, at a scheduling system, a count associated with a playlist and produced by a live broadcast automation system during a live broadcast, wherein the playlist includes a series of segments that comprise the live broadcast, a first marker is associated with a first segment, and a second marker is associated with a second segment, wherein the first segment is a studio segment following a non-studio segment and the second segment is a second non-studio segment following the studio segment, wherein the count represents a time until a start of a next segment associated with a marker;
determining, by the live broadcast automation system, whether the count matches a predetermined value during the live broadcast; and
if the count matches the predetermined value, then based on the playlist and the predetermined value, generating the trigger to a General Purpose Interface (GPI), wherein the trigger defines graphical timing information based on the count and identifies at least one of a plurality of display units controlled by a display controller to provide the graphical timing information to a person on-camera during the live broadcast during a segment the precedes the first segment or the second segment, and wherein the graphical timing information conveys a number of seconds until the start of either the first segment or the second segment.

16. The method of claim 15, wherein determining whether the count matches a predetermined value comprises:
determining whether the count matches a first predetermined value; and
if the count matches the first predetermined value, then determining that the graphical timing information is a first countdown display.

17. The method of claim 16, further comprising:
continuing to monitor the count;
determining whether the count matches a second predetermined value; and
if the count matches the second predetermined value, then determining that the graphical timing information is a second countdown display, wherein the second countdown display represents the second predetermined value regardless of time elapsed since the first predetermined value.

18. The method of claim 17, wherein the first countdown display includes two objects a first distance apart and the second countdown display includes the two objects a second distance apart, wherein the first distance is greater than the second distance.

* * * * *